K. E. WINGE.
SPEED CONTROLLING APPARATUS.
APPLICATION FILED JUNE 5, 1909.
953,164.
Patented Mar. 29, 1910.
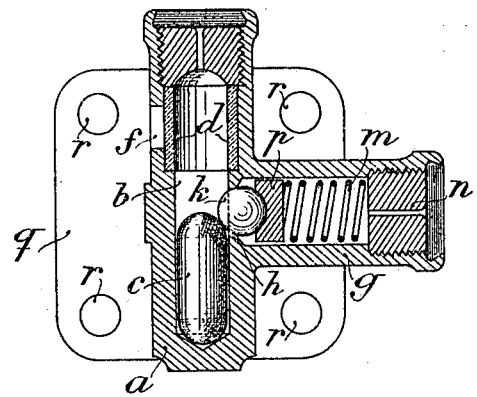
Witnesses:
C. Heymann
L. Lang
Inventor:
Knud Esbern Winge
by B. Singer atty

UNITED STATES PATENT OFFICE.

KNUD ESBERN WINGE, OF COPENHAGEN, DENMARK.

SPEED-CONTROLLING APPARATUS.

953,164.  Specification of Letters Patent.  Patented Mar. 29, 1910.

Application filed June 5, 1909. Serial No. 500,307.

*To all whom it may concern:*

Be it known that I, KNUD ESBERN WINGE, of No. 32 Strandvej, Copenhagen, in the Kingdom of Denmark, civil engineer, have invented certain new and useful Improvements in Speed-Controlling Apparatus, of which the following is a specification.

The object of the present invention is an apparatus by means of which it can be ascertained whether a certain previously fixed rotatory speed of an axle or the like has been surpassed. The apparatus which cannot be influenced by sudden pushes, can be adjusted to act instantaneously when the speed is being surpassed or, if desirable, a certain time after this transgression has taken place.

The invention is shown on the accompanying drawing representing a section through such an apparatus.

The apparatus consists of a cylinder $a$ with an axial channel $b$ in which a runner $c$ of a suitable weight can glide forward and backward. The channel $b$ is closed at both ends, and in the one end is inserted a glass-tube $d$ so as to render it possible, through an aperture $f$ in the cylinder, to observe the position of the runner in the channel $b$. At a right angle to the cylinder $a$ is arranged another cylinder $g$ the cavity of which is connected with the channel $b$ by means of an opening which forms a kind of valve-seat $h$ for a ball-shaped or any other suitably formed body $k$. This body is pressed against its seat by means of a spring $m$ whose tension can be regulated by a screw $n$ and which acts upon a piston $p$ mounted between the ball $k$ and the spring $m$.

The apparatus is mounted eccentrically on the shaft, disk or the like whose rotatory speed is to be controlled and in such a way that the channel $b$ is radial as regards the disk or the like. The runner $c$ is placed in the one end of the channel which is nearest to the revolving axis. When the disk revolves, the runner $c$ will owing to the centrifugal force start sliding through the channel $b$, and it will then press against the ball $k$ with a pressure that is dependent upon the weight of the runner, its distance from the revolving axis and the revolving speed. As long as this pressure is less than the resistance of the ball $k$ the runner will remain in the position shown on the drawing. If the pressure of the runner increases, the ball will be forced back, and the runner glides out into the other end of the channel which can be observed through the hole $f$. If the apparatus is to be used again, it can for instance be turned for which purpose the cylinder $a$ is mounted upon a plate $q$ supplied with fastening-holes $r$ arranged symmetrically in relation to the center-line of the cylinder $g$.

The cylinders $a$ and $g$ can be sealed so as to avoid any fraudulent interference.

To retard the movement of the runner $c$ through the channel $b$ the latter can be filled with a fluid whose degree of fluidity defines the time that must lapse before the apparatus indicates that transgression of speed has taken place.

Having now particularly described and ascertained the nature of this said invention and in what manner the same has to be performed, I declare that what I claim is:

1. A speed indicating device comprising in combination, a unitary structure having means arranged whereby it may be secured to a rotating body, a member disposed in said structure, and means normally holding said member in one position and serving upon the attainment of a predetermined speed of rotation by said body to release said member and permit radial movement thereof to another position.

2. A speed indicating device comprising in combination, a unitary structure having means arranged whereby it may be secured to a rotating body, and provided with an opening, a member disposed in said body and adapted to be actuated centrifugally, and means normally holding said member in a position rendering it invisible through said opening and permitting movement of said member radially into an observable position with respect to said opening upon the attainment of a predetermined speed by said body.

3. A speed indicating device comprising in combination, a unitary structure having means arranged whereby it may be secured on a rotating body, said structure having a passage-way containing a body of liquid and disposed radially with respect to the axis of the rotating body and having an opening therein closed by a transparent element, a member disposed in said passage-way and adapted to be actuated centrifugally, and means engaging said member and normally holding the same in a position rendering it invisible through said opening and permitting movement of said member radially into an observable position with respect to said opening upon the attainment of a predetermined speed by said body.

4. A speed indicating device comprising a unitary structure having means arranged whereby it may be secured on a rotating body, said structure including a cylinder having an opening therein at one end, a member disposed in said cylinder, said structure also including a cylinder disposed angularly with respect to said first mentioned cylinder and means disposed in said angularly arranged cylinder for engaging said member and normally holding the same in a position to render it invisible through said opening and permitting movement of said member radially into an observable position with respect to said opening upon the attainment of a predetermined speed by said body.

5. A speed indicating device comprising in combination, a unitary structure having means arranged whereby it may be secured to a rotating body, a member carried by said structure, and means normally holding said member in one position and serving upon the attainment of a predetermined speed of rotation by said body to release said member and permit radial movement thereof to another position.

6. A speed indicating device comprising in combination, a unitary structure having means whereby it may be secured on a rotating body, said structure having a passageway disposed radially with respect to the axis of the rotating body and having an opening therein, a member disposed in said passageway and adapted to be actuated centrifugally and means engaging said member and normally holding the same in a position rendering it invisible through said opening and permitting movement of said member radially into an observable position with respect to said opening upon the attainment of a predetermined speed by said body.

7. A speed indicating device comprising in combination, a structure having means arranged whereby it may be secured to a rotating body and provided with a hollow casing extending across the axis of said body, a member disposed in said casing, said casing being adapted to contain liquid to retard movement of said member therein, and means normally holding said member in one position in said casing and serving upon the attainment of a predetermined speed of rotation of said body to release said member and permit radial movement thereof to another position.

8. A speed indicating device comprising in combination, a structure having means arranged whereby it may be secured to a rotating body and provided with a hollow casing extending across the axis of said body, a member disposed in said casing, said casing being adapted to contain liquid to retard movement of said member therein, and means normally holding said member inone position in said casing and serving upon the attainment of a predetermined speed of rotation of said body to release said member and permit radial movement thereof to another position, said means serving to retain said member in said last mentioned position.

9. A speed indicating device comprising in combination, a unitary structure having means arranged whereby it may be secured to a rotating body, a member carried by said structure, and means normally holding said member in one position and serving upon the attainment of a predetermined speed of rotation by said body to release said member and permit radial movement thereof to another position and serving to hold said member in the last named position subsequent to its movement thereto.

In testimony, that I claim the foregoing as my invention, I have signed my name in presence of two subscribing witnesses.

KNUD ESBERN WINGE.

Witnesses:
P. HOFMAN-BANG,
ERNEST BOUTARD.